United States Patent
Jang et al.

(10) Patent No.: US 12,253,736 B2
(45) Date of Patent: Mar. 18, 2025

(54) LENS SPACER, LENS MODULE COMPRISING SAME, AND MANUFACTURING METHOD THEREFOR

(71) Applicant: SHINSUNG PRECISION CO., LTD., Gyeonggi-do (KR)

(72) Inventors: Seong Min Jang, Gyeonggi-do (KR); Young Sik Choi, Gyeonggi-do (KR)

(73) Assignee: SHINSUNG PRECISION CO., LTD., Gyeonggi-do (KR)

(*) Notice: Subject to any disclaimer, the term of this patent is extended or adjusted under 35 U.S.C. 154(b) by 490 days.

(21) Appl. No.: 17/770,479

(22) PCT Filed: Dec. 2, 2019

(86) PCT No.: PCT/KR2019/016847
§ 371 (c)(1),
(2) Date: Apr. 20, 2022

(87) PCT Pub. No.: WO2021/091010
PCT Pub. Date: May 14, 2021

(65) Prior Publication Data
US 2022/0390705 A1     Dec. 8, 2022

(30) Foreign Application Priority Data
Nov. 8, 2019   (KR) .................. 10-2019-0142895

(51) Int. Cl.
*G02B 7/02*     (2021.01)
(52) U.S. Cl.
CPC .................. *G02B 7/021* (2013.01)
(58) Field of Classification Search
CPC combination set(s) only.
See application file for complete search history.

(56) References Cited

U.S. PATENT DOCUMENTS

| | | | |
|---|---|---|---|
| 2015/0138424 A1* | 5/2015 | Dobashi | H04N 25/00 348/340 |
| 2015/0159283 A1* | 6/2015 | Tsai | G03F 1/00 118/504 |
| 2020/0357838 A1* | 11/2020 | Fukuyama | H04N 23/55 |

FOREIGN PATENT DOCUMENTS

| | | | | |
|---|---|---|---|---|
| JP | 2012-215655 A | 11/2012 | | |
| KR | 10-1173835 B1 | 8/2012 | | |
| KR | 101253464 B1 * | 4/2013 | | G02B 7/02 |

(Continued)

OTHER PUBLICATIONS

International Search Report from corresponding PCT Application No. PCT/KR2019/016847, dated Aug. 3, 2020.
(Continued)

*Primary Examiner* — Cara E Rakowski
*Assistant Examiner* — Jennifer A Jones
(74) *Attorney, Agent, or Firm* — Harness, Dickey & Pierce, P.L.C.

(57) ABSTRACT

The present invention relates to a camera lens spacer which is adapted to prevent flare effects due to light reflection. The present invention provides a camera lens spacer which is inserted between lenses and comprises a base material made of copper or a copper alloy and having a predetermined thickness, wherein the base material includes: a through-etched area passing therethrough in the thickness direction at the center thereof; and a half-etched area having a predetermined width along the outer circumference of the through-etched area.

11 Claims, 11 Drawing Sheets

(56) References Cited

FOREIGN PATENT DOCUMENTS

| KR | 10-2014-0023551 A | 2/2014 | |
|---|---|---|---|
| KR | 10-1436529 B1 | 9/2014 | |
| KR | 10-1883033 B1 | 7/2018 | |
| KR | 10-2018-0106046 A | 10/2018 | |
| KR | 20180106046 A * | 10/2018 | ............... C23F 1/10 |

OTHER PUBLICATIONS

Notice of Allowance from corresponding Korean Patent Application No. 10-2019-0142895, issued Mar. 2, 2022.
Office Action from corresponding Korean Patent Application No. 10-2019-0142895, issued Apr. 16, 2021.
Office Action from corresponding Korean Patent Application No. 10-2019-0142895, issued Oct. 26, 2021.
Office Action from corresponding Korean Patent Application No. 10-2021-0186611, issued Mar. 7, 2022.

* cited by examiner

LENS SPACER, LENS MODULE COMPRISING SAME, AND MANUFACTURING METHOD THEREFOR

CROSS-REFERENCE TO RELATED APPLICATIONS

This application is a national phase application of PCT Application No. PCT/KR2019/016847, filed on Dec. 2, 2019, which claims the benefit and priority to Korean Patent Application No. 10-2019-0142895, filed on Nov. 8, 2019. The entire disclosures of the applications identified in this paragraph are incorporated herein by references.

TECHNICAL FIELD

The disclosure relates to a camera lens spacer and, more specifically, to a camera lens spacer configured to prevent a flare phenomenon caused by reflection of light.

BACKGROUND ART

In general, a camera lens spacer is fitted between lenses so as to maintain the interval between the lenses. Such a spacer is commonly coated with an opaque material, in most cases, in order to block light.

FIG. 1 is a sectional view of an example of a conventional lens module. As illustrated, multiple lens spacers 10a, 10b, 10c, 10d are provided between multiple lenses 20a, 20b, 20c, 20d, 20e to maintain the interval between the lenses. Light that has passed through the multiple lenses is collected by a photosensitive unit such as an image sensor. Each spacer has a hollow portion formed therein such that light can pass and form an image, and light reflected from the subject is introduced into a camera module and is reflected by the wall surface of the spacer of the hollow portion, thereby causing an optical phenomenon such as a flare phenomenon.

In order to solve such a problem, Registered Korean Patent No. 1882022 discloses a lens spacer wherein the spacer has an edge inclined or curved with regard to the optical axis, thereby reducing the amount of reflected light. Such an edge structure needs to be implemented by mechanical processing such as boring or puncturing, precise processing is necessary to implement such a shape, and the cost for manufacturing the lens spacer may increase accordingly.

Meanwhile, Registered Korean Patent No. 1173835 discloses a lens spacer having a hollow portion formed by etching a copper plate and having a copper oxide film formed on the surface thereof in a needle-shaped structure, thereby suppressing light reflection of the lens spacer. However, there is a possibility that a spacer manufactured by such an etching process may cause a flare phenomenon due to light reflection at the hollow portion edge.

SUMMARY

Technical Problem

In order to solve the above-mentioned problems of the prior art, it is an aspect of the disclosure to provide a lens spacer having a structure configured to suppress a flare phenomenon caused by reflection of light.

It is another aspect of the disclosure to provide a lens spacer having an inclined structure including a slow slope.

It is another aspect of the disclosure to provide a lens spacer having an inclined structure including a combination of a slow slope and a fast slope.

It is another aspect of the disclosure to provide a method for manufacturing the above-mentioned lens spacer by applying an etching process.

Solution to Problem

In order to solve the above-mentioned technical problems, the disclosure provides a camera lens spacer inserted between lenses and including a base material having a predetermined thickness and made of copper or copper alloy material, wherein the base material has a penetration etching region penetrating in a thickness direction and formed in a center portion and a half-etching region having a predetermined width along the outer circumference of the penetration etching region.

In the disclosure, the width of the half-etching region is preferably greater than the thickness of the spacer, and the width of the half-etching region may be at least 2 times, 3 times, or 5 times the thickness of the spacer.

In addition, the half etching region may include a slow slope, and the width of the slow slope may be at least 3 times the thickness of the spacer.

In addition, the half-etching region may include a fast slope.

In addition, the spacer may further include, on the base material surface, a needle-shaped black oxide film.

In the disclosure, the thickness of the spacer base material may be 10-50 μm.

In addition, in the disclosure, the width of the half-etching region is preferably less than 70% of the entire circumference width of the spacer.

In order to solve the above-mentioned other technical problems, the disclosure provides a method for manufacturing a camera lens spacer inserted between lenses, the method including the steps of: (a) providing a plate having a predetermined thickness and made of a copper or copper alloy material; (b) forming a penetration etching region penetrating in a thickness direction and formed in a center portion of the plate; and (c) forming a half-etching region having a predetermined width along a circumference of the penetration etching region.

In the disclosure, the steps (b) and (c) may be performed as one etching process.

In addition, the disclosure may include, before the step (b), the steps of: (d-1) forming a first etching mask pattern for defining the penetration etching region; and (d-2) forming a second etching mask pattern for defining the half-etching region.

In addition, the disclosure may include, after the step (d-2), the step of laminating a protection film on the second etching mask pattern.

Advantageous Effects of Invention

According to the disclosure, a lens spacer having a structure configured to suppress a flare phenomenon caused by reflection of light may be provided. In addition, the disclosure may provide a lens spacer having an inclined structure including a slow slope, which is difficult to provide by mechanical processing. In addition, the disclosure may provide a simple method for manufacturing the above-mentioned lens spacer by applying an etching process.

DETAILED DESCRIPTION

Hereinafter, preferred embodiments of the disclosure will be described with reference to the drawings.

Figure 1:
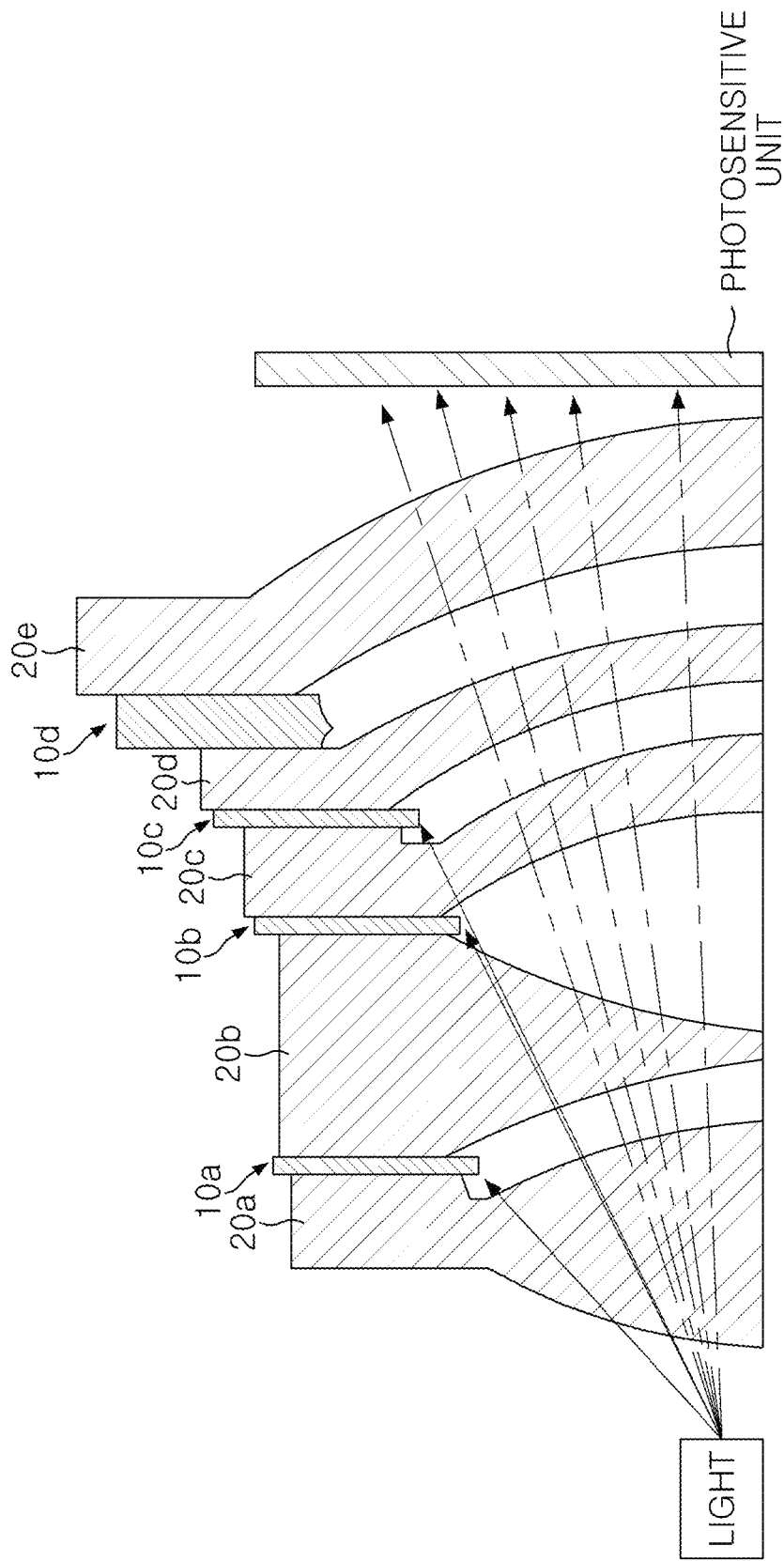
FIG. 1 is a cross-sectional view schematically illustrating a lens module including a lens spacer.
Figure 2:
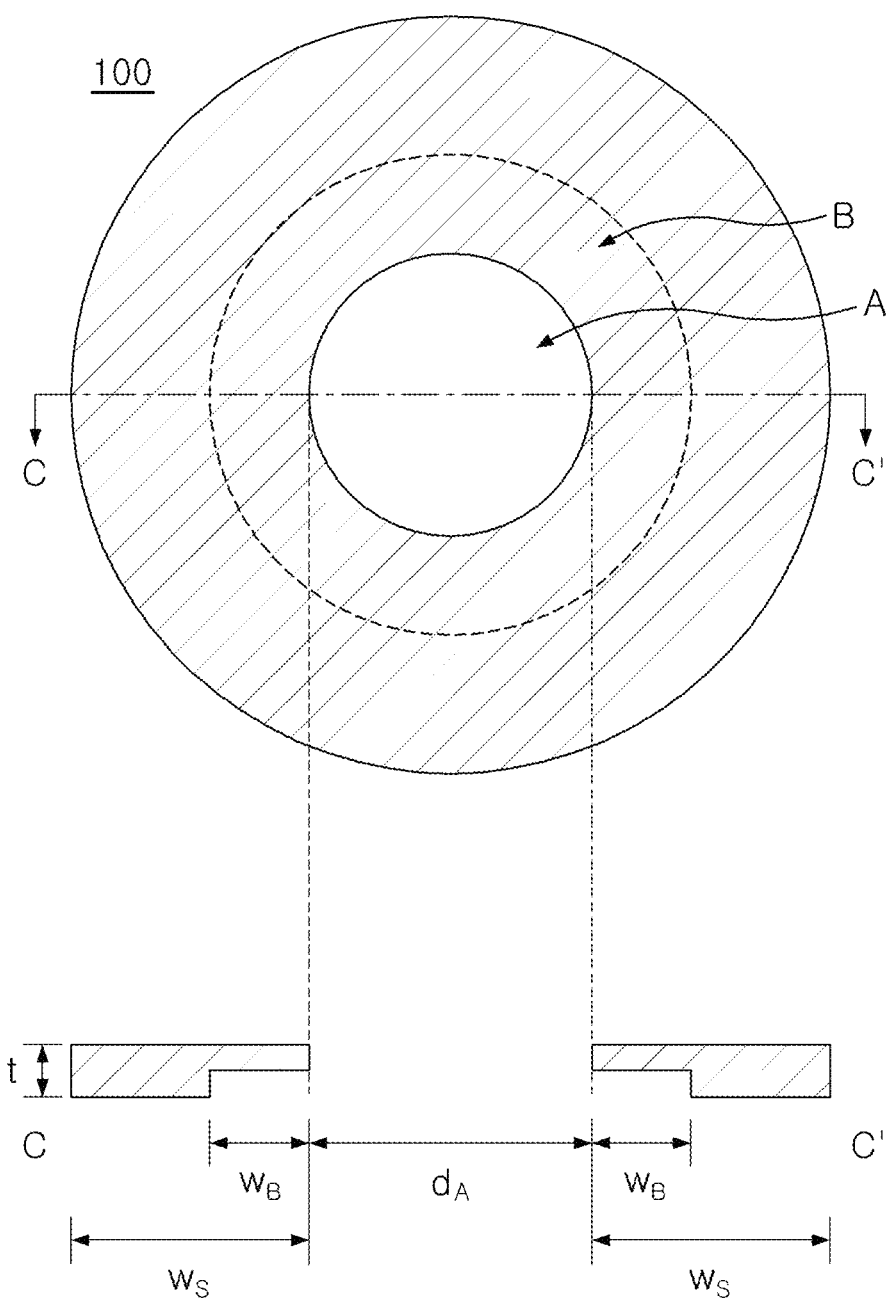
FIG. 2 is a view schematically illustrating a plane and a cross-section of a lens spacer according to an embodiment of the disclosure, wherein the reference characters C and C' indicate a cross section direction of the lens spacer.

FIG. 2 is a view schematically illustrating a plane and a cross-section of a lens spacer according to an embodiment of the disclosure.

Referring to FIG. 2, in the disclosure, a lens spacer 100 uses copper or a copper alloy as a base material 110 for the spacer. The lens spacer 100 may further include the base material 110 and a coating layer for protecting substantially the entire surface of the base material, but the coating layer is not illustrated herein for convenience of illustration. Therefore, the lens spacer 100 in the disclosure may refer to an article before the surface film is formed, and may refer to an article after the surface film is formed.

The base material 110 of the spacer is a ring-shaped base material having a predetermined thickness t and having a hollow part in the center. In addition, in the disclosure, the outer shape of the spacer is illustrated as a circular ring, but other shapes such as a square ring can also be applied. As will be described later, the hollow part is formed by etching. In the specification of the disclosure, this region is a groove penetrated by etching and is referred to as a penetration etching region A.

In the disclosure, the penetration etching region A may be, for example, a circle having a predetermined diameter $d_A$, but is not limited thereto. A half-etching region B having a predetermined width $w_B$ extends along the outer circumference of the penetration etching region A, followed by a non-etching region having a predetermined width. Unless otherwise stated, the quantitative values referred to in the specification of the disclosure refer to average values.

Half-etching is an etching method which reduces the thickness of the base material. Unlike machining, etching cannot uniformly and accurately control the thickness of the resulting base material depending on its position due to factors that are difficult to control, such as local non-uniformity of etching solution composition and solute diffusion problems due to position. For example, in machining, the inclined surface can be finely processed at a predetermined angle, but in etching, the inclination angle may change locally depending on the etching position. In the disclosure, a region having a structural characteristic due to the application of such an etching process is referred to as a half-etching region.

In FIG. 2, the width $w_B$ of the half-etching region B is larger than the thickness t of the base material. Preferably, the width $w_B$ may be 2 times or more, 3 times or more, 4 times or more, or 5 times or more the thickness t. The width $w_B$ of the half-etching region sufficiently separates a start portion of the half-etching region from a hollow edge to minimize the effect of the start edge on reflection.

In addition, the width $w_B$ of the half-etching region B is preferably less than 70%, less than 60%, less than 50%, less than 40%, less than 30%, or less than 20% of the entire circumference width $w_s$ of the spacer.

Referring to FIG. 2, the penetration etching region, the half-etching region, and the non-etching region are connected in a stepwise manner. However, in the disclosure, this connection structure is merely an example.

Figure 3:
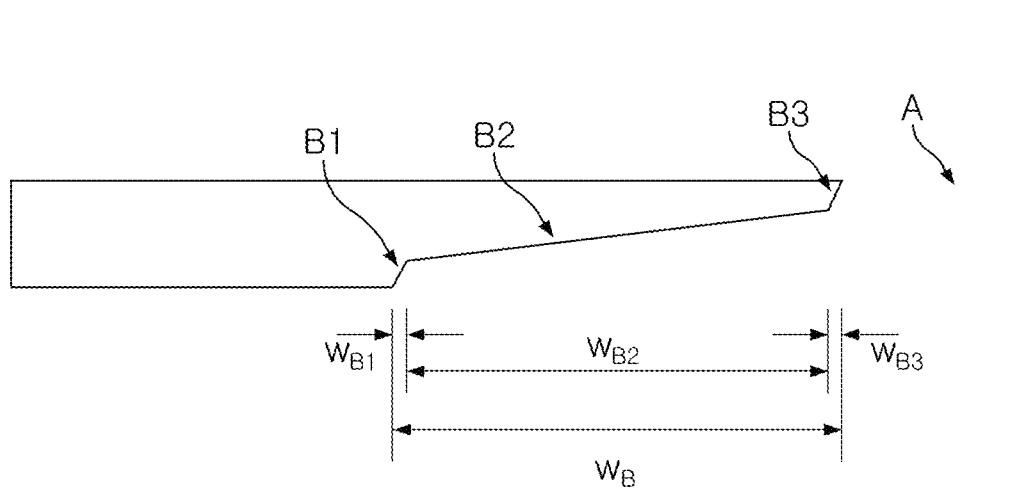
FIG. 3 is a view schematically illustrating a cross-sectional structure of a lens spacer according to an embodiment of the disclosure.

FIG. 3 is a view schematically illustrating a cross-section of a lens spacer according to another embodiment of the disclosure. FIG. 3 illustrates only a spacer on the left side with reference to the penetration etching area A.

Referring to FIG. 3, the half-etching region B is divided into a plurality of sub-regions B1, B2, and B3. The sub-regions include a slow slope region B2 having a gentle slope and fast slope regions B1 and B3 having a steeper slope, and the width $w_B$ of the slow slope region B2 is larger than the respective widths $w_{B2}$ or $w_{B3}$ of the fast slope regions B1 and B3 and occupies most of the width of the half-etching region. In the disclosure, the width $w_{B2}$ of the slow slope may be 2 times or more, 3 times or more, 4 times or more, or 5 times or more the thickness t of the spacer base material. In addition, the width $w_{B2}$ of the slow slope is preferably less than 70%, less than 60%, less than 50%, less than 40%, less than 30%, or less than 20% of the entire circumference width $w_s$ of the spacer.

Meanwhile, in the drawings, the first slope region and the slow slope region are represented by straight lines, respectively, but this is a schematic representation of the average slope, and each region can form a curved shape partially or entirely. In the disclosure, the average inclination angle of the slow slope may be 25° or less, 20° or less, 15° or less, 10° or less, or 5° or less with reference to the surface of the base material.

The wide slow slope region in such an inclined structure substantially reduces the thickness occupied by the fast slope region adjacent to the penetration etching region A in the entire thickness t of the spacer base material. Accordingly, the thickness of the fast slope region adjacent to the penetration etching region A of the spacer is significantly reduced to be smaller than the base material thickness t. For example, the thickness of the spacer edge on the hollow part side may be less than 80%, less than 70%, less than 60%, or less than 50% with respect to the total thickness t. As described above, the disclosure has the effect of substantially reducing the thickness of the spacer at the hollow edge part. In addition, although the thickness of the spacer hollow edge is substantially reduced, the thickness of the spacer body is not reduced. That is, the spacer maintains the original role and rigidity of separating the lens module.

Figure 4:
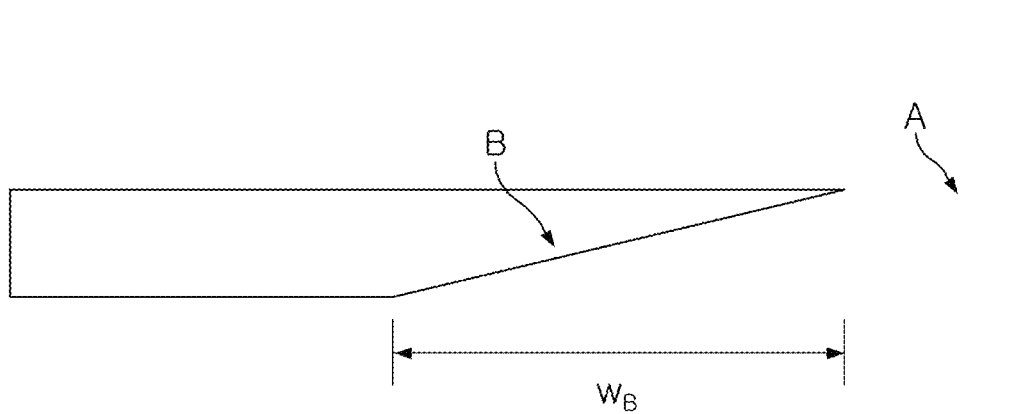
FIG. 4 is a view schematically illustrating a cross-sectional structure of a lens spacer according to another embodiment of the disclosure.

FIG. 4 is a view schematically illustrating a cross-section of a lens spacer according to still another embodiment of the disclosure.

Referring to FIG. 4, the entire section $w_B$ of the half-etching region substantially includes a slow slope region without a region being regarded as a fast slope region.

A structure of the lens spacer with reference to FIG. 2 to FIG. 4 above, but the lens spacer of the disclosure may further include a surface coating layer formed on the surface of a copper or copper alloy base material. The surface coating layer may preferably be a black copper oxide layer. More preferably, the surface coating layer may be a black copper oxide layer having a needle-shaped structure. The black copper oxide layer on the surface of the spacer base material may be formed by an appropriate method. The method for manufacturing a black copper oxide layer having a needle-shaped structure disclosed in Registered U.S. Pat. No. 1,173,835 of the present applicant may be applied. For example, after heating an aqueous solution of caustic soda (NaOH) and chlorite soda ($NaClO_2$) in a weight ratio of 9:1 to a temperature of 70 to 90° C., a black copper oxide layer having a needle-shaped structure may be produced on the surface by immersing the spacer for 5 to 15 minutes.

The slow slope structure of the disclosure is a structure which is difficult to be introduced by general machining such as punching and perforation. The thickness of a lens spacer used in a mobile terminal such as a mobile phone camera module is gradually decreasing, and it is more difficult to incline the edge of the spacer having a thickness of 50 μm or less or 35 μm or less by mechanical processing. In the disclosure, the inclined surface structure including the slow slope structure is introduced by a half-etching process. This will be described later.

Figure 5:
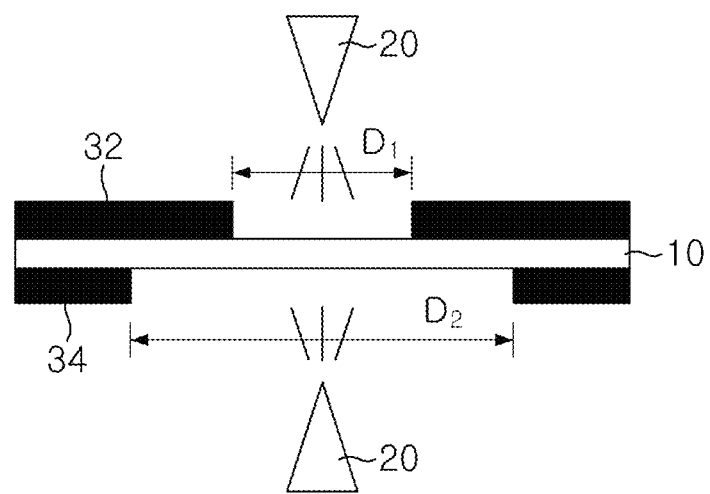
FIG. 5 is a view schematically illustrating a lens spacer manufacturing process according to an embodiment of the disclosure.

FIG. 5 is a view schematically illustrating a lens spacer manufacturing process according to an embodiment of the disclosure.

Referring to FIG. 5, a first etching mask pattern 32 having a first opening having a predetermined width D1 for defining the penetration etching region A is formed on one surface of a copper plate or a copper foil 10 having a predetermined thickness, and a second etching mask pattern 34 having a second opening having a predetermined width D2 for defining the half-etching region B is formed on the other surface thereof.

As illustrated above, the width D2 of the mask pattern defining the half-etching region is greater than the width D2 of the mask pattern defining the penetration etching region. In the disclosure, the opening widths D1 and D2 are for defining the penetration etching region and the half-etching region, respectively, but they do not match each other and may be empirically set according to the etching conditions.

In the disclosure, the first etching mask pattern 32 and the second etching mask pattern 34 may be formed by photoresist coating, photosensitizing, and exposure steps. Of course, any form of mask which can function as an etching mask may be used.

Next, spray nozzles 20 are arranged above and below the copper plate 10 on which the first mask pattern and the second mask pattern are formed, and the etching solution is sprayed. The etching solution corrodes the exposed portion of the copper plate 10 to form a penetration etching region and a half-etching region.

In the disclosure, the etching solution includes ferric chloride or copper (II) chloride, which are highly corrosive, as main components and may include hydrochloric acid and water. In addition, in the disclosure, the etching conditions may be appropriately selected in consideration of the etching profile so that the vicinity of the opening D1 is penetrated and the vicinity of the opening D2 is half-etched. In addition, the case where the first etching mask and the second etching mask are formed and the penetration etching region and the half-etching region are in-situ formed in one etching step has been described above, but of course, the etching process using the first etching mask pattern and the etching process using the second etching mask pattern may be sequentially applied.

When the etching process has completed, the first etching mask pattern and the second etching mask pattern on the copper plate surface may be removed by suitable methods such as stripping or ashing.

Figure 6:
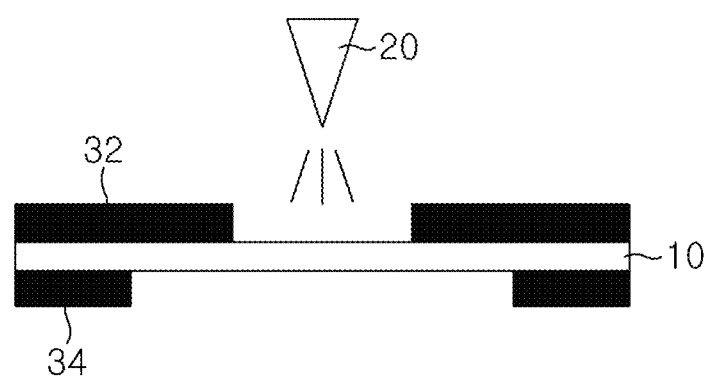
FIG. 6 is a view schematically illustrating a lens spacer manufacturing process according to another embodiment of the disclosure.

FIG. 6 is a view schematically illustrating a lens spacer manufacturing process according to another embodiment of the disclosure.

Referring to FIG. 6, as in FIG. 5, the first mask pattern 32 and the second mask pattern 34 are formed on the surface of the copper plate 10. However, unlike FIG. 5, the etching solution is sprayed from the upper nozzle 20, and the back surface of the copper plate is not provided with a nozzle for supplying the etching solution. However, after the etching solution penetrates the copper plate 10 to form a through-hole, the etching solution is supplied to the back surface to partially etch the back surface.

Figure 7:
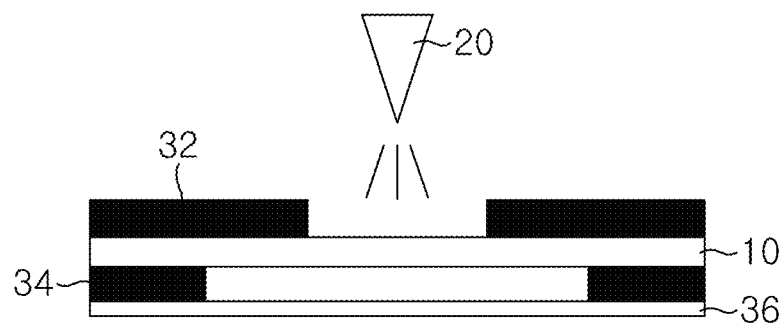
FIG. 7 is a view schematically illustrating a lens spacer manufacturing process according to still another embodiment of the disclosure.

FIG. 7 is a view schematically illustrating a lens spacer manufacturing process according to still another embodiment of the disclosure.

As in FIG. 5 and FIG. 6, the first mask pattern 32 and the second mask pattern 34 are formed on the surface of the copper plate 10. Meanwhile, a protective film 36 is laminated on the surface of the second mask pattern 34. A random film having etching resistance against an etching solution may be used as the protective film. For example, an adhesive tape or the like may be used as the protective film. For example, the product name ST-5535 of Daehyun ST may be used. The protective film 36 may provide resistance against the flow of the etching solution even after penetrating the copper plate to prevent the back surface portion of the copper plate from being rapidly etched.

MODE FOR CARRYING OUT THE INVENTION

Embodiment 1

A photoresist is applied to the surface of a copper plate having a thickness of about 30 μm and a diameter of 6 mm, and is exposed and developed to form the mask pattern illustrated in FIG. 5 to FIG. 7. The etching solution (ferric chloride concentration 40-43%) is sprayed through a spray nozzle at a flow rate of 2 LPM for 1 minute. The manufactured spacer is embedded and cured in an epoxy resin and the cross-section of the spacer is observed.

For comparison, a sample is prepared by performing only penetration etching without half-etching. In this case, the opening width of the first mask pattern and the opening width of the second mask pattern are made to be identical.

Figure 8A:
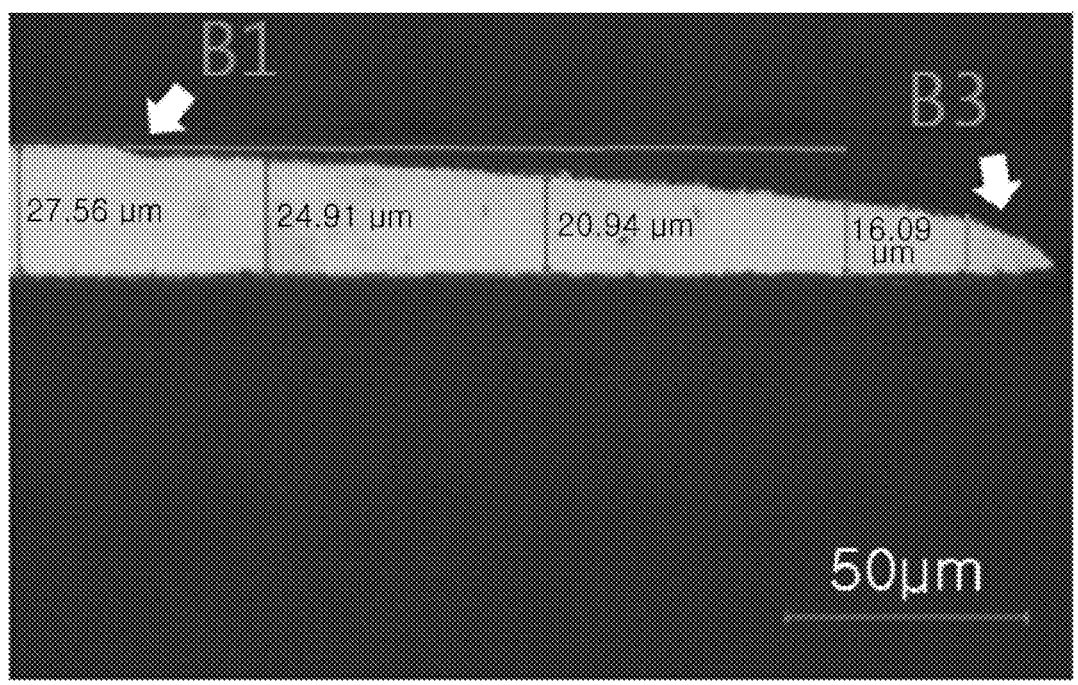
FIGS. 8A, 8B, 8C and 8D are optical micrographs of a cross-section of a lens spacer manufactured according to a first embodiment of the disclosure.
Figure 8B:
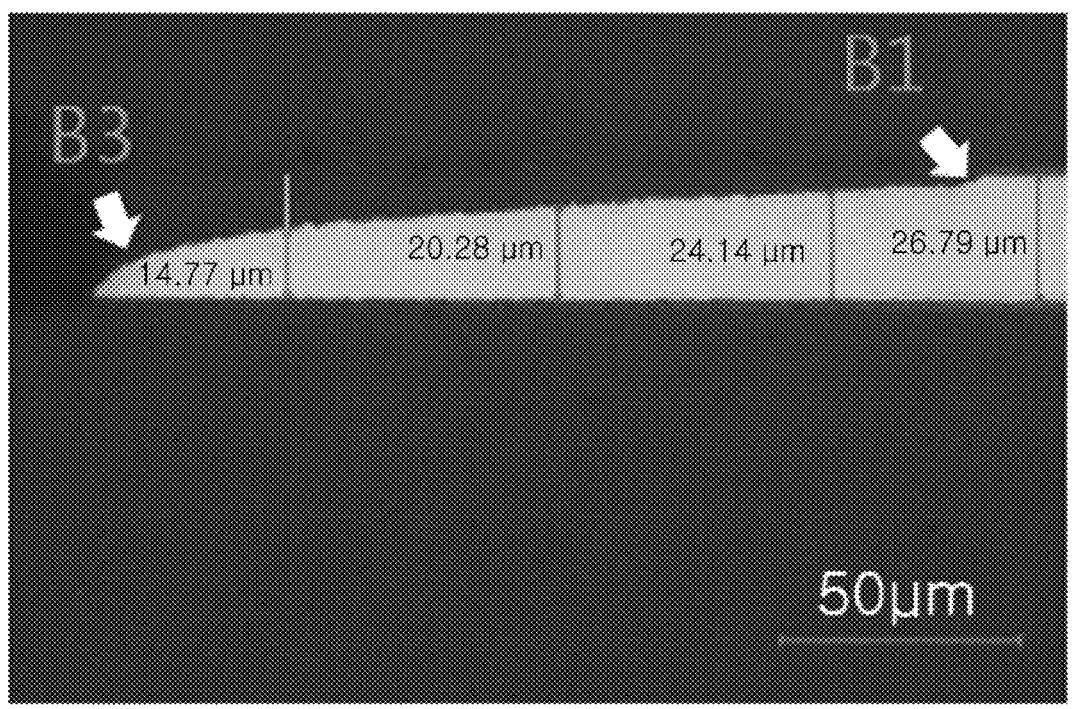

FIG. 8A to FIG. 8D are optical micrographs of left and right, with reference to a hollow part, cross-sections of a spacer manufactured according to the present embodiment. As shown in FIG. 8A and FIG. 8B, a fast slope region B1 at the start portion of the half-etching region, a fast slope region B3 at the end portion of the half-etching region, and a slow slope region having a gentle slope and formed therebetween may be confirmed. In addition, it can be seen that due to the very wide slow slope region, the thickness of the fast slope region B3 at the end of the half-etching region is reduced to a level of 15 μm or less. In addition, from the photograph, it can be seen that the surface of the half-etching region has an uneven and rough surface, and the inclined profile does not show a smooth straight line.

Figure 8C:
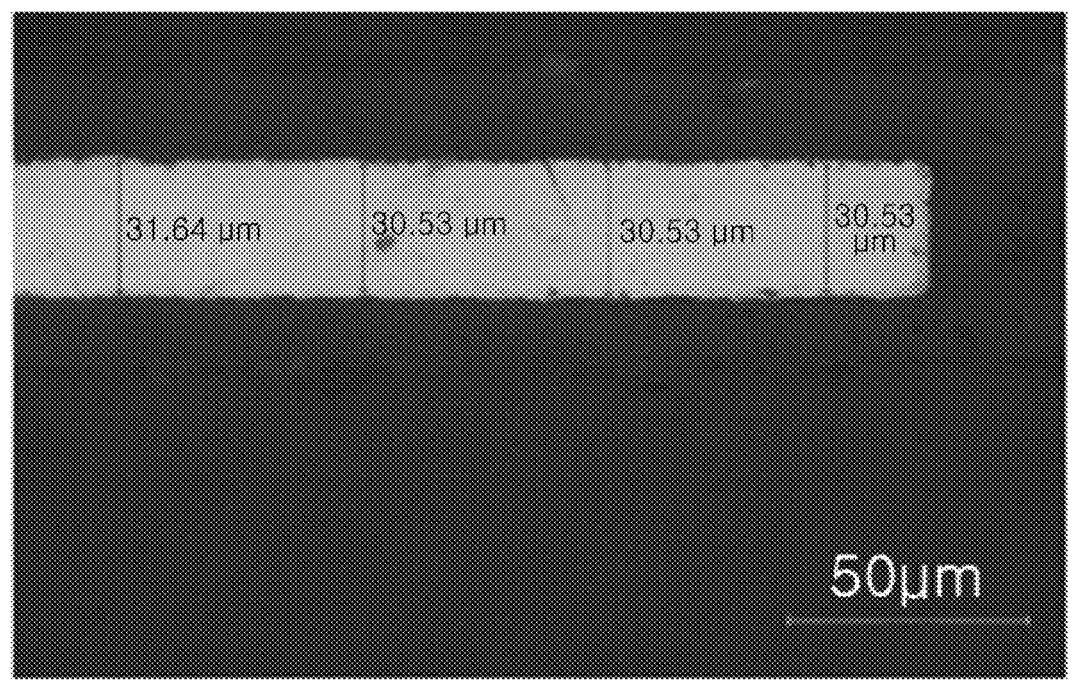
Figure 8D:
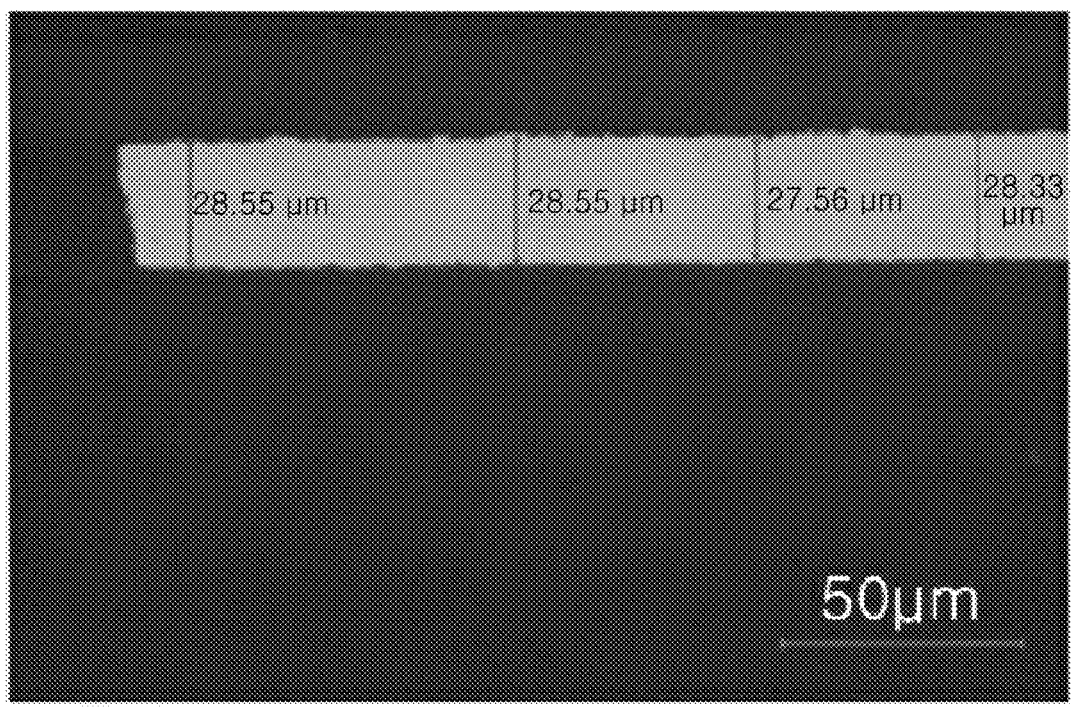

Meanwhile, FIGS. 8C and 8D are photographs of the cross-section of a spacer of a comparative example. It can be seen that the thickness of the hollow side edge of the spacer reaches about 30 μm.

Embodiment 2

A spacer is manufactured by the same method as in Embodiment 1 except that the thickness of the copper plate is about 20 μm, and the cross-section thereof is observed.

Figure 9A:
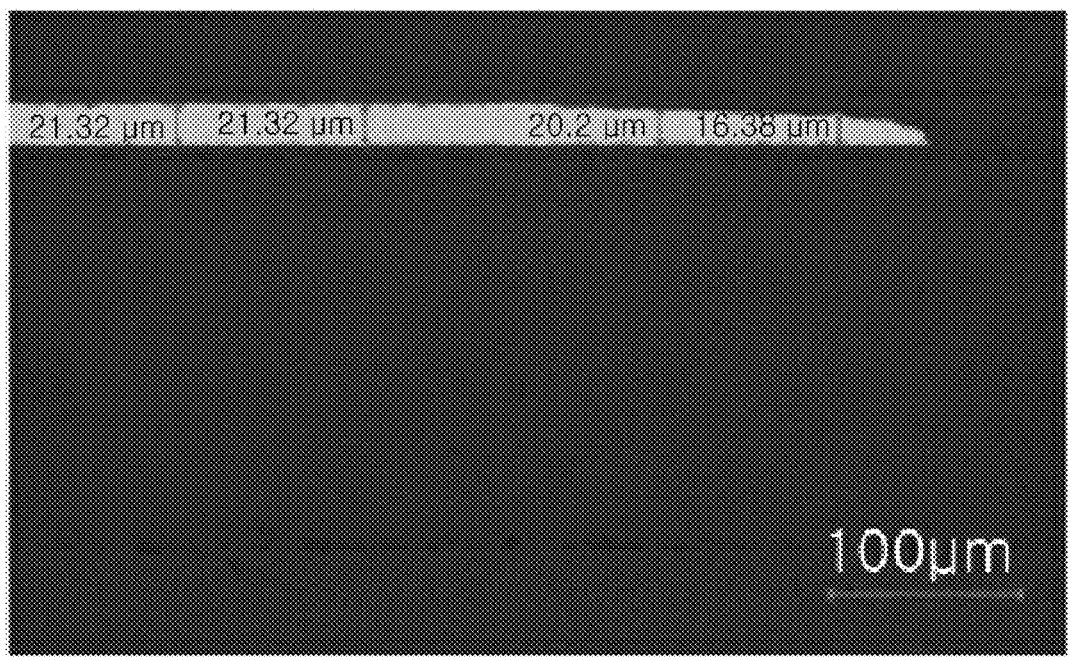
FIGS. 9A, 9B, 9C and FIG. 9D are optical micrographs of a cross-section of a lens spacer manufactured according to a second embodiment of the disclosure.
Figure 9B:
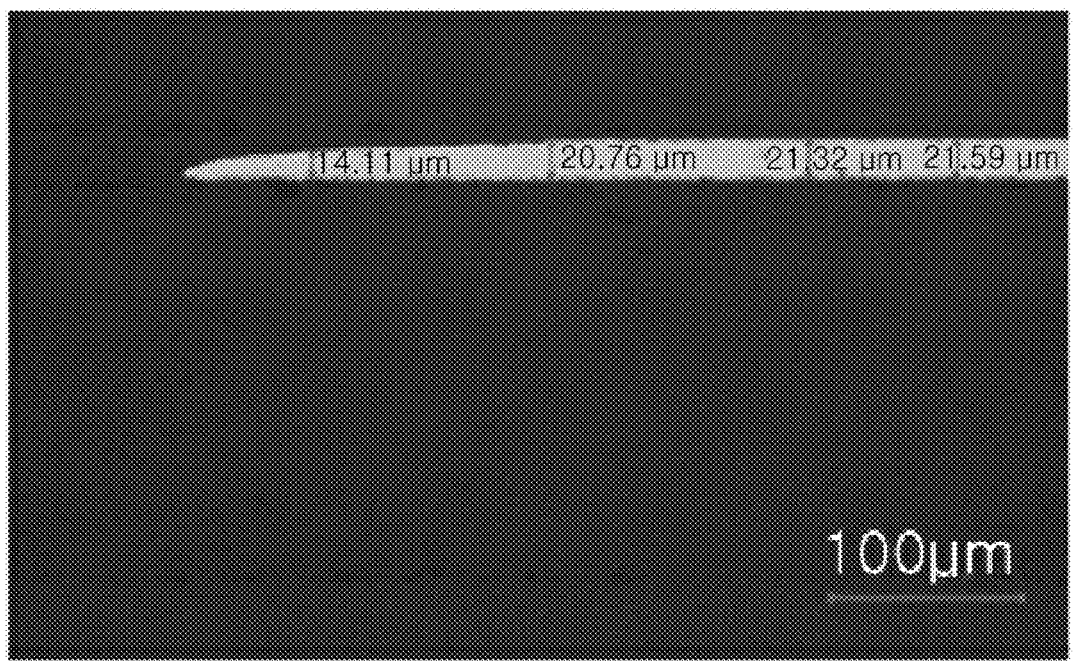
Figure 9C:
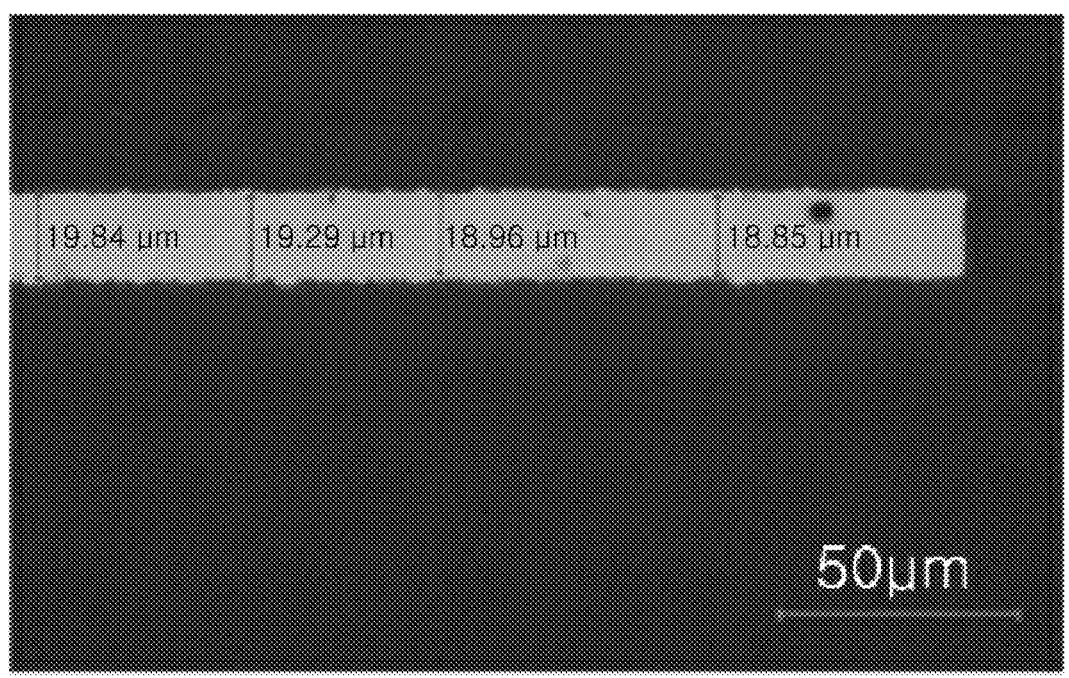
Figure 9D:
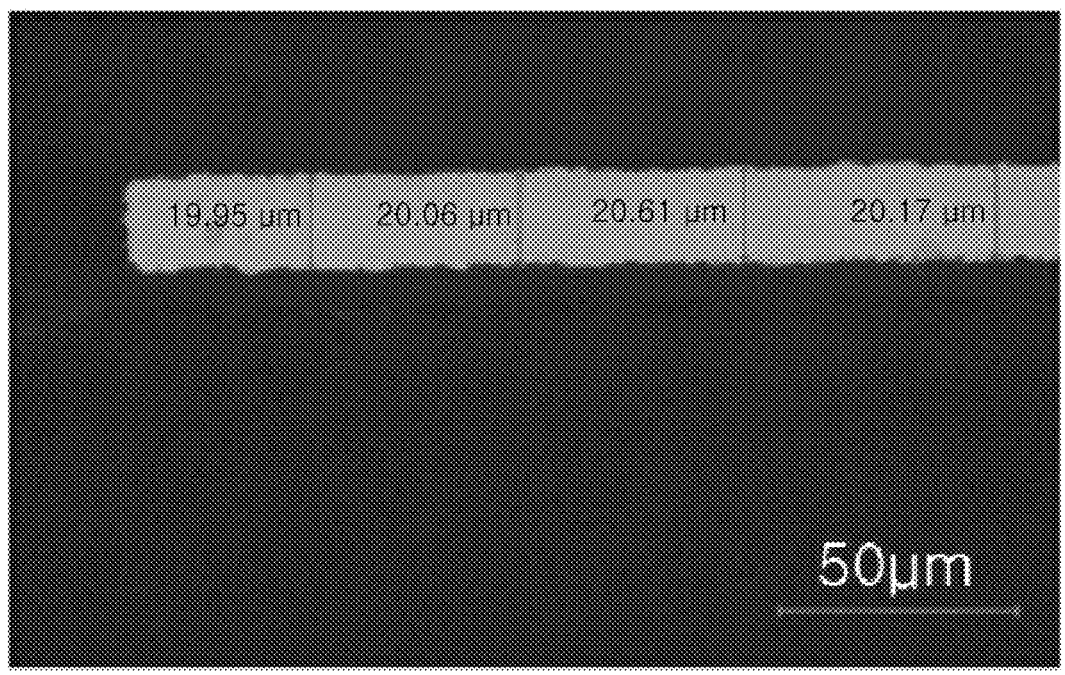

FIG. 9A and FIG. 9B are optical micrographs of the cross-section of the spacer manufactured according to the present embodiment, and FIG. 9C and FIG. 9D are optical micrographs of the cross-section of the spacer manufactured according to the comparative example. It can be seen that most of the half-etching region consists of a slow slope region, and the edge part of the end portion of the half-etching region forms a narrow-width fast slope region. However, in the present embodiment, the fast slope region does not appear to be identified at the start portion of the half-etching region.

Embodiment 3

Figure 10A:
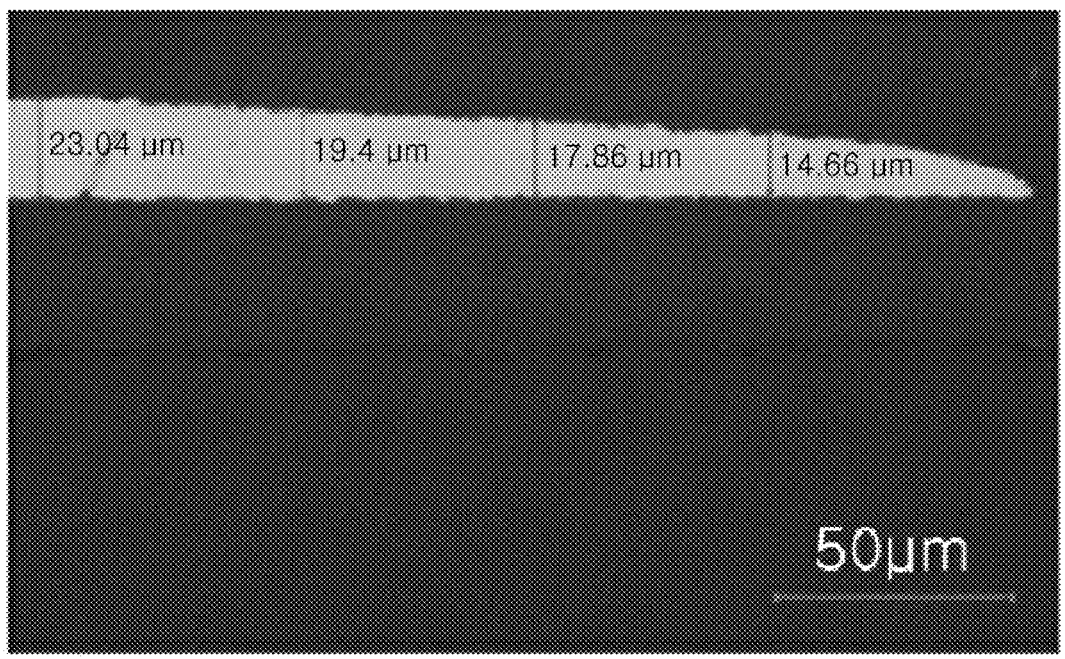
FIGS. 10A, 10B, 10C and 10D are optical micrographs of a cross-section of a lens spacer manufactured according to a third embodiment of the disclosure.
Figure 10B:
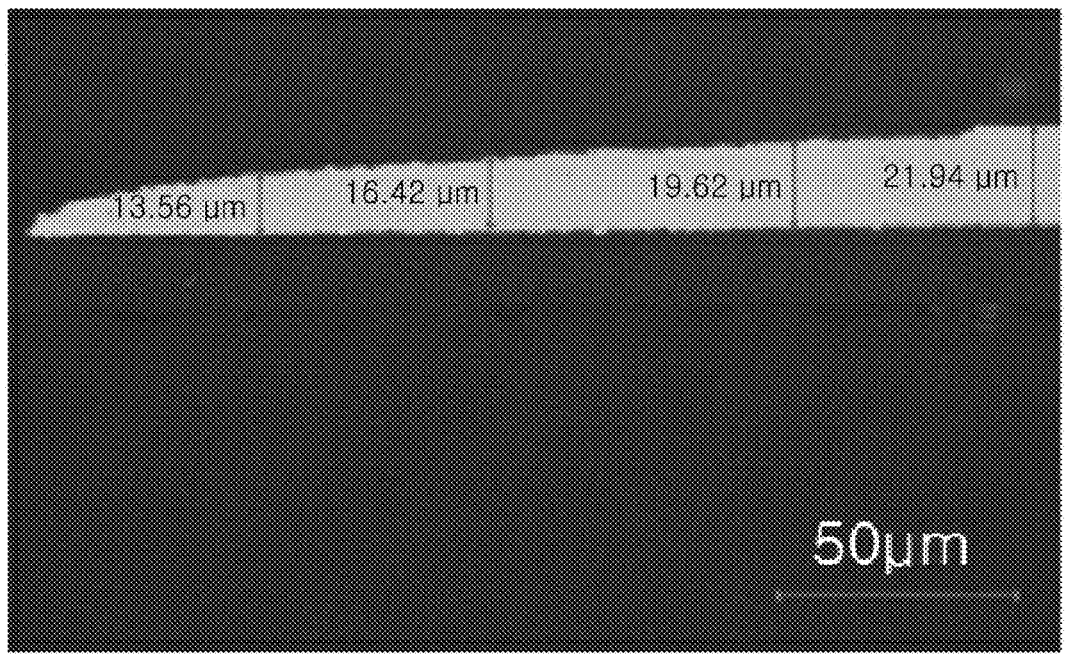
Figure 10C:
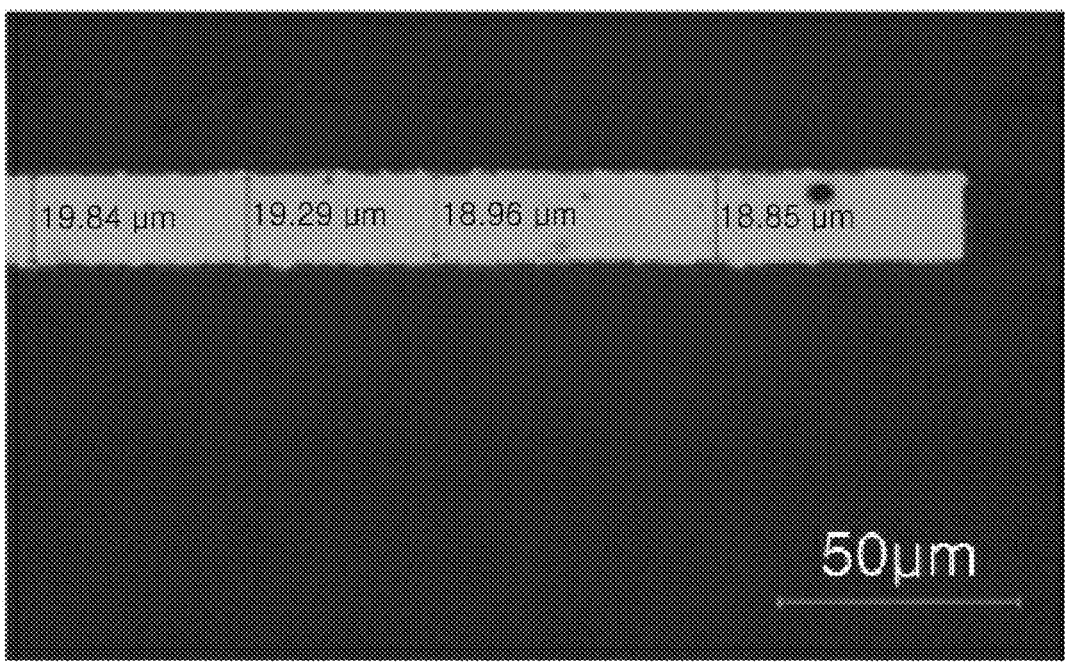
Figure 10D:
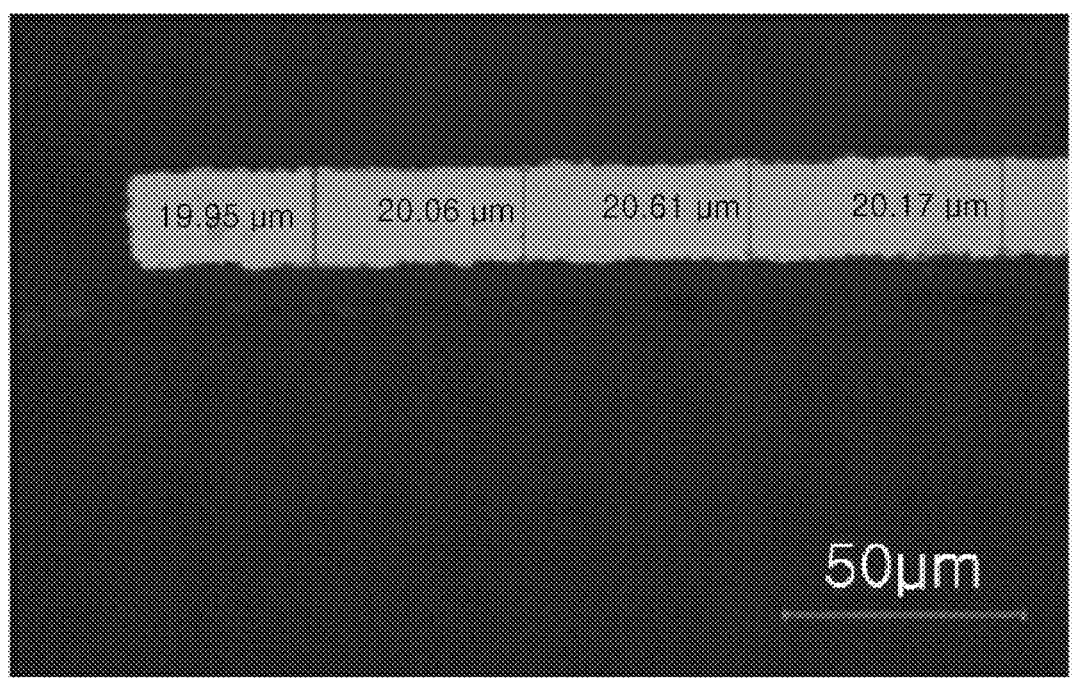

A spacer is manufactured by the same method as in Embodiment 1 except that the thickness of the copper plate is about 25 μm, and the cross-section thereof is observed. FIG. 10A and FIG. 10B are optical micrographs of the cross-section of the spacer manufactured according to the present embodiment, and FIG. 10C and FIG. 10D are optical micrographs of the cross-section of the spacer manufactured according to the comparative example. As described with reference to FIG. 8 and FIG. 9, also in the present embodiment, it is possible to confirm the decrease in the thickness of the slow slope region and the fast slope region at the end portion of the half-etching region.

INDUSTRIAL APPLICABILITY

The disclosure is applicable to a camera lens module, and is particularly useful for a camera lens module of a mobile phone.

What is claimed is:

1. A camera lens spacer inserted between lenses and comprising a base material having a predetermined thickness and made of copper or copper alloy material,
    wherein the base material has a penetration etching region penetrating in a thickness direction and formed in a center portion and a half-etching region having a predetermined width along the outer circumference of the penetration etching region,
    wherein the width of the half-etching region is 3 times or more the thickness of the spacer.

2. The camera lens spacer of claim 1, wherein the half etching region includes a slow slope.

3. The camera lens spacer of claim 1, wherein the width of the slow slope is 3 times or more the thickness of the spacer.

4. The camera lens spacer of claim 2, wherein the half-etching region includes a fast slope.

5. The camera lens spacer of claim 1, wherein the base material surface further includes a needle-shaped black oxide film.

6. The camera lens spacer of claim 1, wherein the thickness of the spacer is 10-50 μm.

7. The camera lens spacer of claim 1, wherein the width of the half-etching region is less than 70% of the entire circumference width of the spacer.

8. A method for manufacturing a camera lens spacer inserted between lenses, the method comprising the steps of:
    (a) providing a plate having a predetermined thickness and made of a copper or copper alloy material;
    (b) forming a penetration etching region penetrating in a thickness direction and formed in a center portion of the plate; and
    (c) forming a half-etching region having a predetermined width along a circumference of the penetration etching region,
    wherein the width of the half-etching region is 3 times or more the thickness of the spacer.

9. The method of claim 8, wherein the steps (b) and (c) are performed as one etching process.

10. The method of claim 8, before the step (b), comprising the steps of:
    (d-1) forming a first etching mask pattern for defining the penetration etching region; and
    (d-2) forming a second etching mask pattern for defining the half-etching region.

11. The method of claim 10, after the step (d-2), comprising the step of laminating a protection film on the second etching mask pattern.

* * * * *